(12) United States Patent
Frost

(10) Patent No.: US 6,612,959 B2
(45) Date of Patent: *Sep. 2, 2003

(54) THREE-SPEED TRANSFER CASE

(75) Inventor: Barry L. Frost, Hastings, MI (US)

(73) Assignee: New Venture Gear, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/202,341

(22) Filed: Jul. 24, 2002

(65) Prior Publication Data

US 2002/0193201 A1 Dec. 19, 2002

Related U.S. Application Data

(63) Continuation of application No. 09/815,797, filed on Mar. 23, 2001.

(51) Int. Cl.$^7$ ................................................ F16H 3/44
(52) U.S. Cl. ........................ 475/288; 475/295; 475/302; 180/248
(58) Field of Search ............................... 475/295, 288, 475/302; 180/233, 247, 248, 249, 250

(56) References Cited

U.S. PATENT DOCUMENTS 4,736,653 A * 4/1988 Hayakawa et al. ......... 475/146
5,954,612 A * 9/1999 Baxter, Jr. .................. 475/198
6,464,612 B2 * 10/2002 Frost .......................... 475/288

* cited by examiner

Primary Examiner—Jack Lavinder
Assistant Examiner—Robert A. Siconolfi
(74) Attorney, Agent, or Firm—Harness, Dickey & Pierce, P.L.C.

(57) ABSTRACT

A transfer case having an input shaft, an output shaft, and a planetary gearset connected therebetween. The planetary gearset includes a first sun gear, a second sun gear, a carrier coupled for rotation with the input shaft, a ring gear coupled for rotation with the output shaft, and meshed pairs of first and second pinions rotatably supported on the carrier with each first pinion meshed with the first sun gear and each second pinion meshed with the second sun gear and the ring gear. The transfer case further includes a powershift clutch assembly comprised of a first range clutch located between the carrier and the ring gear, a second range clutch located between the first sun gear and a stationary member, and a third range clutch located between the second sun gear and the stationary member. Actuation of the clutches is controlled by a hydraulic control system for shifting each of the clutches between actuated and non-actuated modes to establish three different speed ratio drive connections between the input and output shafts.

26 Claims, 8 Drawing Sheets

| OPERATIVE MODE | FIRST RANGE CLUTCH | SECOND RANGE CLUTCH | THIRD RANGE CLUTCH | TRANSFER CLUTCH |
|---|---|---|---|---|
| TWO-WHEEL DRIVE HIGH-RANGE | LOCKED | RELEASED | RELEASED | 2WD |
| ON-DEMAND 4WD HIGH-RANGE | LOCKED | RELEASED | RELEASED | 4WD ADAPTIVE |
| LOCKED 4WD HIGH-RANGE | LOCKED | RELEASED | RELEASED | 4WD LOCK |
| NEUTRAL | RELEASED | RELEASED | RELEASED | 2WD |
| TWO-WHEEL DRIVE LOW-RANGE | RELEASED | LOCKED | RELEASED | 2WD |
| ON-DEMAND 4WD LOW-RANGE | RELEASED | LOCKED | RELEASED | 4WD ADAPTIVE |
| LOCKED 4WD LOW-RANGE | RELEASED | LOCKED | RELEASED | 4WD LOCK |
| TWO-WHEEL DRIVE OVERDRIVE | RELEASED | RELEASED | LOCKED | 2WD |
| ON-DEMAND 4WD OVERDRIVE | RELEASED | RELEASED | LOCKED | 4WD ADAPTIVE |
| LOCKED 4WD OVERDRIVE | RELEASED | RELEASED | LOCKED | 4WD LOCK |

| OPERATIVE MODE | FIRST RANGE CLUTCH | SECOND RANGE CLUTCH | THIRD RANGE CLUTCH | TRANSFER CLUTCH |
|---|---|---|---|---|
| TWO-WHEEL DRIVE HIGH-RANGE | LOCKED | RELEASED | RELEASED | 2WD |
| ON-DEMAND 4WD HIGH-RANGE | LOCKED | RELEASED | RELEASED | 4WD ADAPTIVE |
| LOCKED 4WD HIGH-RANGE | LOCKED | RELEASED | RELEASED | 4WD LOCK |
| NEUTRAL | RELEASED | RELEASED | RELEASED | 2WD |
| TWO-WHEEL DRIVE LOW-RANGE | RELEASED | RELEASED | LOCKED | 2WD |
| ON-DEMAND 4WD LOW-RANGE | RELEASED | RELEASED | LOCKED | 4WD ADAPTIVE |
| LOCKED 4WD LOW-RANGE | RELEASED | RELEASED | LOCKED | 4WD LOCK |
| TWO-WHEEL DRIVE OVERDRIVE | RELEASED | LOCKED | RELEASED | 2WD |
| ON-DEMAND 4WD OVERDRIVE | RELEASED | LOCKED | RELEASED | 4WD ADAPTIVE |
| LOCKED 4WD OVERDRIVE | RELEASED | LOCKED | RELEASED | 4WD LOCK |

THREE-SPEED TRANSFER CASE

CROSS REFERENCE TO RELATED APPLICATION

This application is a continuation of U.S. application Ser. No. 09/815,797 filed Mar. 23, 2001 and entitled "THREE SPEED TRANSFER CASE", which application is herein expressly incorporated by reference.

FIELD OF THE INVENTION

The present invention relates generally to transfer cases for use in four-wheel drive motor vehicles. In particular, the present invention is directed to a three-speed powershift transfer case.

BACKGROUND OF THE INVENTION

Due to increased consumer demand for four-wheel drive vehicles, a plethora of different power transfer systems are currently utilized for directing power (i.e., drive torque) to all four wheels of the vehicle. In many applications, a transfer case is used to transfer power from the powertrain to the front and rear drivelines. Moreover, many modern transfer cases are equipped with a two-speed gear reduction unit for establishing high-range and low-range drive modes to accommodate differing road conditions and off-road terrains. Typically, the high-range drive mode is a direct speed ratio for use during most normal driving conditions while the low-range drive mode is an underdrive ratio useful during low-speed off-road conditions.

The two-speed gear reduction unit used in most transfer cases is either a layshaft arrangement or a planetary gearset with one or more clutches that are selectively actuated for making the drive connections. As a convenience feature, many gear reduction units now include a system for permitting such "range" shifting to be accomplished without first stopping the vehicle. In some instances, synchronized dog clutches are used to permit "on-the-move" shifting between the high-range and low-range drive modes. Examples of such synchronized range shift systems for transfer cases are disclosed in commonly-owned U.S. Pat. Nos. 5,346,442; 5,655,986; 5,702,321; 5,836,847; and 5,902,205. Alternatively, it is known to employ a powershift clutch arrangement in two-speed transfer cases for shifting on-the-move between the high-range and low-range drive modes. In this regard, U.S. Pat. Nos. 5,443,429; 5,688,202; and 5,700,222 disclose powershift-type range shift systems in transfer cases.

In most four-wheel drive vehicles equipped with a transfer case, the transmission output shaft is coupled to the transfer case input shaft. However, in some applications, an add-on gearbox, commonly referred to as a compounder assembly, is installed between the transmission output shaft and the transfer case input shaft for providing an additional gear ratio, such as an "overdrive" ratio. An example of an add-on overdrive transmission assembly is shown in commonly-owned U.S. Pat. No. 4,798,103. Due to the long leadtime and cost associated with developing new multi-speed transmissions, the use of a compounder assembly in conjunction with an existing transmission for providing an additional gear ratio has found commercial success. One design compromise, however, is the additional length required in the vehicle's powertrain to accept installation of the compounder assembly.

From the foregoing, it is apparent that transfer cases equipped with two-speed gear reduction units have been successfully integrated into four-wheel drive vehicles. However, a need still exists to develop alternative gear reduction units that further advance the technology in the field of four-wheel drive transfer cases.

SUMMARY OF THE INVENTION

It is therefore an object of the present invention to provide a three-speed transfer case for use in four-wheel drive vehicles.

As a related object, the transfer case of the present invention includes a powershift clutch assembly in association with a planetary gearset for establishing three distinct speed ratio drive connections between an input shaft and an output shaft.

According to another object, the present invention integrates the function of an add-on compounder and a two-speed gear reduction unit into a transfer case for use in four-wheel drive vehicles. In this regard, the three-speed transfer case of the present invention is operable to establish a first drive connection, a second drive connection, and a third drive connection between the input shaft and the output shaft.

According to the present invention, the transfer case includes an input shaft, an output shaft, and a planetary gearset connected therebetween. The gearset includes a first sun gear, a second sun gear, a carrier coupled for rotation with the input shaft, meshed pairs of first and second pinions rotatably supported on the carrier with each first pinion meshed with the first sun gear and each second pinion meshed with the second sun gear, and a ring gear coupled for rotation with the output shaft and which is meshed with the first or second pinions. The transfer case further includes a powershift clutch assembly comprised of a first range clutch located between the carrier and the ring gear, a second range clutch located between the first sun gear and a stationary member, and a third range clutch located between the second sun gear and the stationary member. Actuation of the range clutches is controlled by a hydraulic control system for shifting each range clutch between actuated and non-actuated modes to establish the three different speed ratio drive connections. The three speed ratios include a direct drive speed ratio, an underdrive speed ratio and an overdrive speed ratio.

In accordance with an alternative embodiment, the planetary gearset includes a compound pinion gear rotatably supported on the carrier and having a first pinion meshed with the first sun gear and a second pinion meshed with the second sun gear and the ring gear. Actuation of the three range clutches establishes three speed ratios including a direct speed ratio and two different overdrive speed ratios.

BRIEF DESCRIPTION OF THE DRAWINGS

Further objects, features and advantages of the present invention will become apparent to those skilled in the art from a reading of the following description in conjunction with the accompanying drawings, in which.

DETAILED DESCRIPTION OF THE PREFERRED EMBODIMENTS

Figure 1:
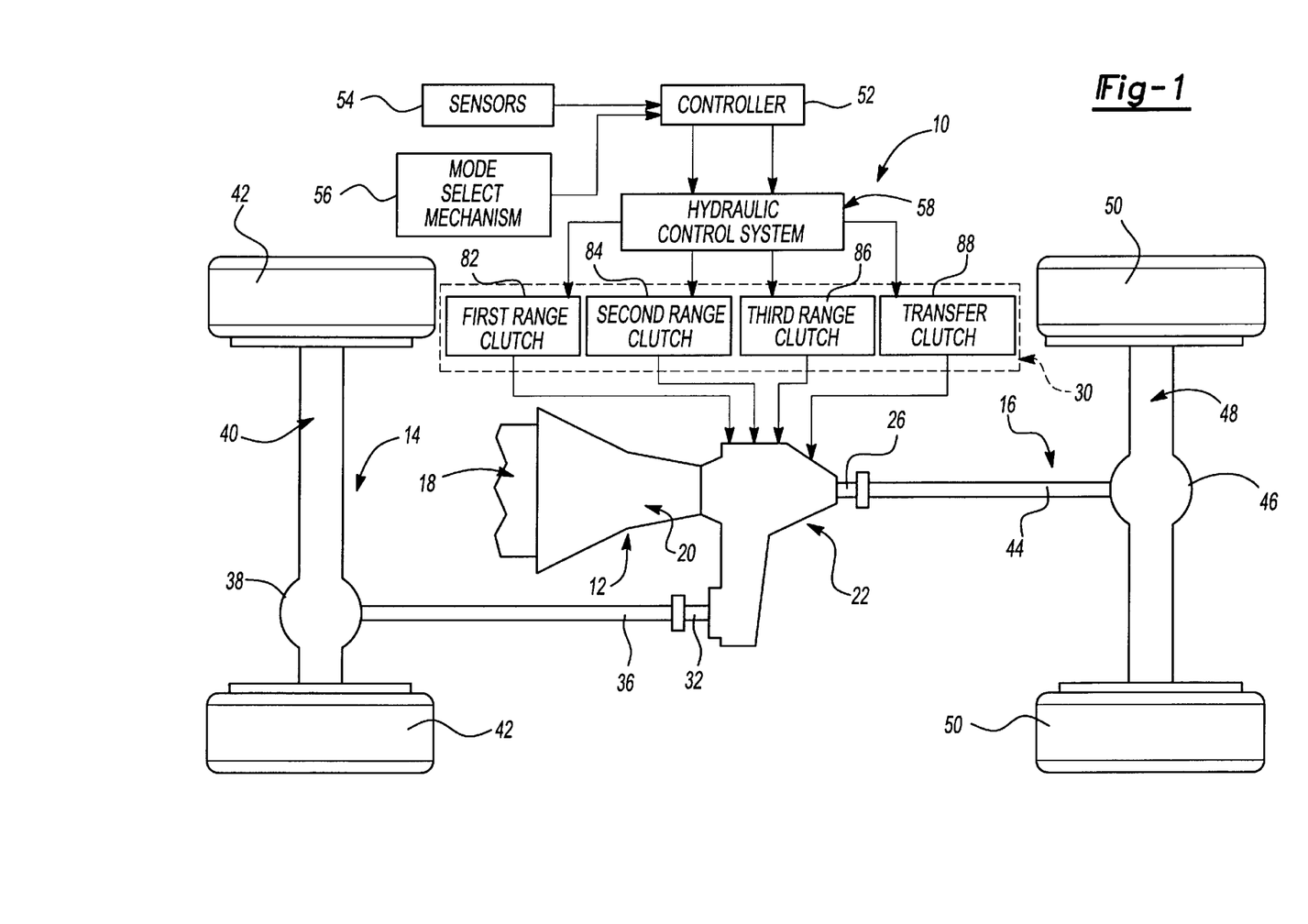
FIG. 1 is a schematic illustration of a four-wheel drive motor vehicle equipped with the three-speed transfer case of the present invention.

Referring now to the drawings, a drivetrain 10 for a four-wheel drive vehicle is shown to include a powertrain 12 for supplying power (i.e., drive torque) to front driveline 14 and rear driveline 16. Powertrain 12 includes an engine 18, a multi-speed transmission 20, and a transfer case 22. Transfer case 22 has an input shaft 24 driven by an output shaft of transmission 20, a rear output shaft 26, a planetary gearset 28, and a powershift clutch assembly 30 which can be selective actuated to engage gearset 28 for establishing three distinct drive connections between input shaft 24 and rear output shaft 26. Transfer case 22 also includes a front output shaft 32 and a transfer mechanism 34 for supplying drive torque from rear output shaft 26 to front output shaft 32.

Front driveline 14 includes a front propshaft 36 interconnecting front output shaft 32 to a differential 38 of a front axle assembly 40 for driving front wheels 42. Similarly, rear driveline 16 includes a rear propshaft 44 interconnecting rear output shaft 26 to a differential 46 of a rear axle assembly 48 for driving rear wheels 50. As further illustrated in FIG. 1, a controller 52 receives sensor signals from vehicle sensors 54 and a mode signal from a mode select mechanism 56 for use in controlling actuation of a hydraulic control system 58 in response to a particular drive mode selected by the vehicle operator. As will be detailed, hydraulic control system 58 functions to control actuation of three range clutches associated with powershift clutch assembly 30 and a transfer clutch associated with transfer mechanism 34.

Figure 2:
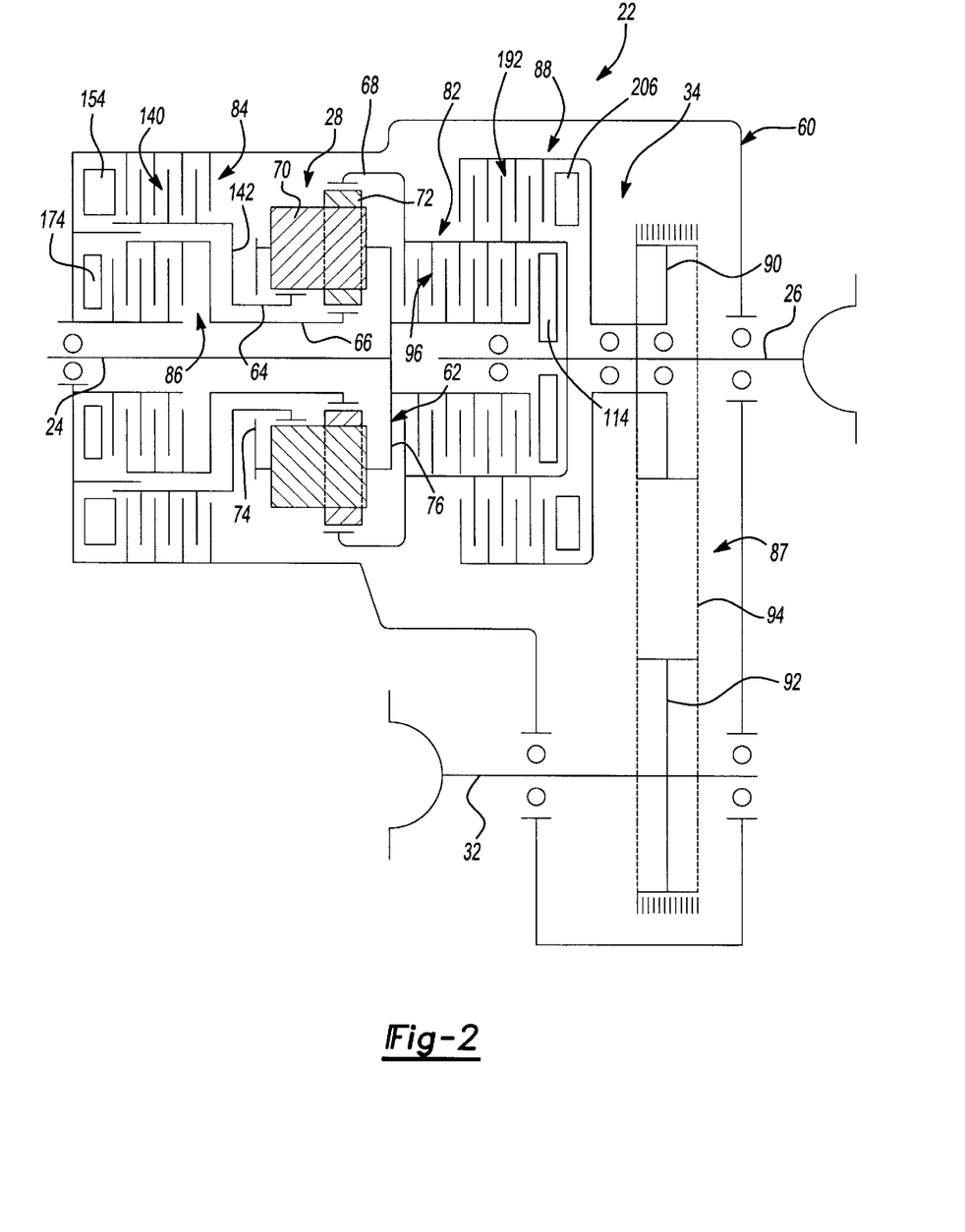
FIG. 2 is a schematic illustration of a three-speed transfer case according to the present invention.
Figure 3:
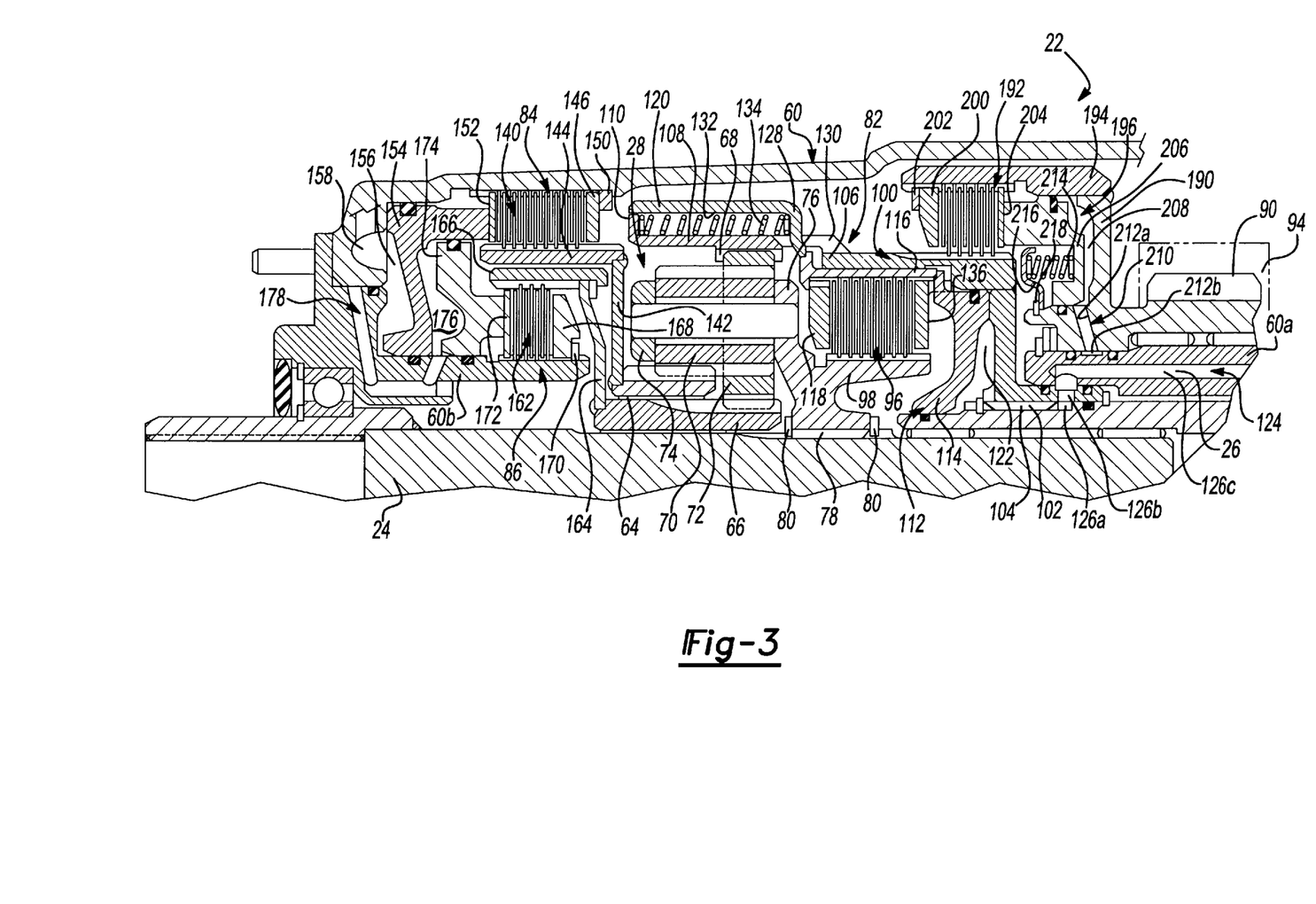
FIG. 3 is a partial sectional view of a three-speed transfer case, based on the schematic version shown in FIG. 2, showing the planetary gearset and powershift clutch assembly in greater detail.

With particular reference to FIGS. 2 and 3, transfer case 22 includes a housing 60 which rotatably supports input shaft 24, rear output shaft 26, and front output shaft 32 via suitable bearing assemblies. Gearset 28 is shown to include a carrier assembly 62 driven by input shaft 24, a first sun gear 64, a second sun gear 66, a ring gear 68 driving rear output shaft 26, a set of first pinions 70 rotatably supported from carrier assembly 62 and meshed with first sun gear 64, and a set of second pinions 72 rotatably supported from carrier assembly 62 and meshed with second sun gear 66 and ring gear 68. First and second pinions 70 and 72 are arranged in meshed pairs and are retained between a front carrier ring 74 and a rear carrier ring 76 which are bolted together to define carrier assembly 62. As seen, rear carrier ring 76 includes a hub segment 98 which is fixed via a splined connection 78 for rotation with input shaft 24 and is axially restrained thereon by snap rings 80. As noted, powershift clutch assembly 30 includes three range clutches which include a first range clutch 82 located between ring gear 68 and carrier assembly 62, a second range clutch 84 located between housing 60 and first sun gear 64, and a third range clutch 86 located between housing 60 and second sun gear 66. In addition, transfer mechanism 34 includes a transfer assembly 87 and a transfer clutch 88 located between rear output shaft 26 and transfer assembly 87 for transferring drive torque from rear output shaft 26 to front output shaft 32. Transfer assembly 87 includes a drive sprocket 90 supported for rotation relative to rear output shaft 26, a driven sprocket 92 fixed for rotation with front output shaft 32, and a power chain 94 meshed with drive sprocket 90 and driven sprocket 92.

As best seen from FIG. 3, first range clutch 82 is a multi-plate wet clutch assembly that is spring-loaded to normally function in a "locked" mode so as to couple ring gear 68 for common rotation with carrier assembly 62. First range clutch 82 includes a clutch pack 96 mounted between a hub segment 98 of rear carrier ring 74 and a drum housing 100 fixed for rotation with rear output shaft 26. Clutch pack 96 is comprised of a set of inner clutch plates that are splined to hub segment 98 and which are alternately interleaved with a set of outer clutch plates that are splined to drum housing 100. Drum housing 100 includes an end plate 102 that is fixed via a splined connection 104 to rear output shaft 26, and a cylindrical outer drum 106 welded to end plate 102. As seen, ring gear 68 is formed on a raised end segment 108 of outer drum 106 which terminates with a radial flange 110. First range clutch 82 also includes a spring-loaded piston assembly 112 comprised of a piston 114, a piston sleeve 116 fixed (i.e., welded) to piston 114, a pressure plate 118 fixed (i.e., welded) to piston sleeve 116, and a piston drum 120 also fixed to piston sleeve 116. Piston 114 is retained in a pressure chamber 122 which is hydraulically connected to hydraulic control system 58 via a first flow pathway 124. First flow pathway 124 includes an axial slotted channel 126a formed in rear output shaft 26, a radial port 126b formed through end plate 102, and an axial bore 126c formed in a bulkhead 60a of housing 60. Slotted channel 126a is aligned with missing spline teeth associated with splined connection 104 to permit fluid flow to pressure chamber 122. Suitable O-ring seals are shown for providing fluid-tight sealed junctions between end plate 102 and corresponding surfaces of rear output shaft 26 and bulkhead 60a.

With continued reference to FIG. 3, piston drum 120 is shown to have an end segment defining lugs 128 which extend through slots 130 formed in end segment 108 of outer drum 106. Piston drum 120 extends over and encloses radial flange 110 of outer drum 106 so as to define an annular spring chamber 132 therewith. A plurality of coil springs 134 are mounted in spring chamber 132 between spring flange 110 and lugs 128 to normally bias piston assembly 112 in a rearward direction (i.e., to the right in FIG. 3) to an engaged position for causing pressure plate 118 to exert a maximum clamping load on clutch pack 96, thereby coupling ring gear 68 for common rotation with carrier assembly 62 and establishing the "locked" mode of first range clutch 82. As seen, a reaction plate 136 is retained against outer drum 106 such that clutch pack 96 is located between reaction plate 136 and pressure plate 118. Due to lugs 128 being retained in slots 130, piston assembly 112 rotates with drum housing 100 and is biased by springs 134 to its engaged position. Upper and lower O-ring seals are shown for maintaining a fluid-tight sliding seal between piston 114 and corresponding wall surfaces of drum housing 100 and rear output shaft 26. As will be detailed, the supply of high pressure fluid from hydraulic control system 58 to pressure chamber 122 via first flow pathway 124 causes piston assembly 112 to move axially in a forward direction from its engaged position to a released position. With piston assembly 112 in its released position, pressure plate 118 disengages clutch pack 96 to permit relative rotation between carrier assembly 62 and ring gear 68 such that first range clutch 82 is considered to be functioning in a "released" mode.

Second range clutch 84 is shown as a multi-plate wet clutch assembly including a clutch pack 140 mounted between housing 60 and a clutch drum 142 that is fixed to first sun gear 64. Clutch pack 140 includes a set of outer clutch plates that are splined to housing 60 and which are alternately interleaved with a set of inner clutch plates that are splined to a cylindrical hub segment 144 of clutch drum 142. A reaction plate 146 is also splined to housing 60 and is axially restrained by a snap ring 150. In addition, an apply plate 152 is splined to housing 60 such that clutch pack 140 is retained between apply plate 152 and reaction plate 146. Second range clutch 84 also includes a piston 154 disposed in an annular pressure chamber 156 formed in housing 60 and which is hydraulically connected to hydraulic control system 58 via a second flow pathway 158. Piston 154 is shown retracted in a forward direction to a released position such that apply plate 152 is released from clamped engagement with clutch pack 140 so as to permit unrestricted rotation of first sun gear 64 relative to housing 60. With piston 154 located in its released position, second range clutch 84 is considered to be functioning in a "released" mode. However, delivery of high pressure fluid to pressure chamber 156 via second flow pathway 158 causes piston 154 to move in a rearward direction from its released position to an engaged position for causing apply plate 152 to exert a clamping load on clutch pack 140, thereby braking rotation of first sun gear 64. With piston 154 in its engaged position, second range clutch 84 is defined as operating in a "locked" mode. Upper and lower O-ring seals are provided to maintain a fluid-tight seal between piston 154 and corresponding wall surfaces of housing 60 to define pressure chamber 156.

With continued reference to FIGS. 2 and 3, third range clutch 86 is shown as a multi-plate wet clutch assembly including a clutch pack 162 mounted between a bulkhead segment 60b of housing 60 and a clutch drum 164 that is fixed to second sun gear 66. Clutch pack 162 includes a set of outer clutch plates splined to a drum segment 166 of clutch drum 164 and which are alternately interleaved with a set of inner clutch plates splined to bulkhead 60b. A reaction plate 168 is splined to bulkhead 60b and is axially restrained by a snap ring 170. As seen, clutch pack 162 is located between reaction plate 168 and an apply plate 172 that is also splined to bulkhead 60b. Third range clutch 86 also includes a piston 174 disposed in a pressure chamber 176 defined between bulkhead 60b and piston 154 of second range clutch 84, with suitable O-ring seals providing a fluid-tight seal relative thereto. Pressure chamber 176 is hydraulically connected to hydraulic control system 58 via a third flow pathway 178 formed in bulkhead 60b. Piston 174 is shown in a released position such that apply plate 172 is disengaged from clutch pack 162 so as to permit unrestricted rotation of second sun gear 66 relative to housing 60. With piston 174 located in its released position, third range clutch 86 is considered to be operating in a "released" mode. Delivery of high pressure fluid to pressure chamber 176 via third flow pathway 178 causes piston 174 to move from its released position to an engaged position for causing apply plate 172 to exert a clamping load on clutch pack 162, thereby braking rotation of second sun gear 66. With piston 174 in its engaged position, third range clutch 86 is considered to be operating in a "locked" mode.

Transfer clutch 88 is a multi-plate wet clutch assembly that is spring-loaded to normally function in a "2WD" mode with all drive torque transmitted to rear output shaft 26. Transfer clutch 88 includes a clutch drum 190 fixed to drive sprocket 90, a clutch pack 192 mounted between a cylindrical hub segment 194 of clutch drum 190 and outer drum 106 of drum housing 100, and a spring-biased piston assembly 196. Clutch pack 192 includes a set of outer clutch plates that are splined to hub segment 194 of clutch drum 190 and which are alternately interleaved with a set of inner clutch plates that are splined to outer drum 106. A reaction plate 200 is also splined to hub segment 194 of clutch drum 190 and is retained thereon by a snap ring 202. In addition, an apply plate 204 is splined to hub segment 194 of clutch drum 190. Piston assembly 196 includes a piston 206 disposed in a pressure chamber 208 formed by clutch drum 190 and which is hydraulically connected to hydraulic control system 58 via a fourth flow pathway 210. Pathway 210 includes one or more radial bores 212a formed through sprocket 90 and a channel 212b formed in bulkhead 60b with appropriate O-ring seals providing a fluid seal between sprocket 90 and bulkhead 60a. In addition, suitable O-ring seals provide a fluid-tight seal between piston 206 and wall surfaces of clutch drum 190.

A plurality of coil springs 214 are retained between piston 206 and a spring retainer plate 216 that is secured via a snap ring 218 to clutch drum 190. Springs 214 normally bias piston 206 in a rearward direction to a released position such that apply plate 204 exerts a predetermined minimum clutch load on clutch pack 192 to permit relative rotation between drum housing 100 and drive sprocket 90. Delivery of pressurized fluid to pressure chamber 208 via fourth flow pathway 210 causes piston 206 to move, in opposition to the biasing of springs 214, from its released position toward an engaged position. Such movement of piston 206 causes apply plate 204 to exert a corresponding clamping load on clutch pack 192, thereby transferring drive torque through transfer assembly 87 to front output shaft 32 for establishing a "4WD" mode. Additionally, movement of piston 206 to a fully-engaged position results in a maximum clutch load being exerted on clutch pack 192 such that transfer clutch 88 rigidly couples drive sprocket 90 for common rotation with rear output shaft 26, whereby transfer clutch 88 is considered to be operating in a "4WD Lock" mode. Moreover, based on the magnitude of the fluid pressure supplied to pressure chamber 208, the axial position of piston 206 can be controlled between its released position and its fully-engaged position. Thus, the fluid pressure supplied by hydraulic control system 58 can be controlled to modulate the rear-to-front torque transfer ratio across transfer clutch 88 in a range from 100%–0% to 50%—50% so as to provide a "4WD ADAPTIVE" mode of operation with optimal torque transfer control based on road conditions and sensed vehicle operating conditions. An example of a control system applicable to control such adaptive or on-demand operation of transfer clutch 88 can be found in commonly-owned U.S. Pat. No. 5,688,202. However, since the novelty of the present invention resides in the three-speed powershift clutch and gearset arrangement, those skilled in the art will appreciate that other actively-controlled (i.e., electromagnetic clutches, cam-actuated clutches, etc.), passively-controlled (i.e., viscous couplings, geared traction couplings, hydromechanical couplings, etc.) can be substituted for the particular hydraulically-actuated transfer clutch 88 disclosed. In addition, it is contemplated that drum housing 100 could act as the driven input member of an interaxle differential which connects the front and rear output shafts in a full-time transfer case instead of being coupled to rear output shaft 26. In such a full-time arrangement, transfer clutch 88 would be used to regulate speed differentiation and torque biasing across the interaxle differential.

In operation, transfer case 22 is capable of being power-shifted for establishing three distinct drive connections between input shaft 24 and rear output shaft 26. In particular, a first drive connection is established with piston 114 of first range clutch 82 in its engaged position, piston 154 of second range clutch 84 in its released position, and piston 174 of third range clutch 86 in its released position. Thus, with fluid pressure vented from pressure chambers 122, 156 and 176, clutch pack 96 of first range clutch 82 couples carrier assembly 62 to ring gear 68, whereby rear output shaft 26 is driven at the same speed as input shaft 24 to define a direct drive or "high-range" drive mode. Accordingly, the high-range drive mode is established when first range clutch 82 is in its locked mode while second range clutch 84 and third range clutch 86 are in their released modes.

When it is desired to shift transfer case 22 into an underdrive or "low-range" drive mode such as, for example, when the vehicle is being driven off-road, a mode signal is sent by mode shift mechanism 56 to controller 52. Controller 52 then sends control signals to hydraulic control system 58 for establishing a second drive connection between input shaft 24 and rear output shaft 26. The second drive connection is established by supplying high pressure fluid to pressure chambers 122 and 156 while pressure chamber 176 is vented. The supply of pressurized fluid to pressure chamber 122 causes piston 114 of first range clutch 82 to move from its engaged position to its released position for releasing clutch pack 96, thereby releasing ring gear 68 for rotation relative to carrier assembly 62. In addition, venting of pressure chamber 176 causes piston 174 of third range clutch 86 to be maintained in, or move to, its released position for releasing clutch pack 162 such that second sun gear 66 is free to rotate. Likewise, the supply of pressurized fluid to pressure chamber 156 causes piston 154 of second range clutch 84 to move from its released position to its engaged position for causing clutch pack 140 to brake first sun gear 64. The geometry of the gear components associated with planetary gearset 28 causes rear output shaft 26 to be driven at a reduced speed relative to input shaft 24 so as to define the low-range drive mode. Accordingly, the low-range drive mode is established when first range clutch 82 is in its released mode, second range clutch 84 is in its locked mode, and third range clutch 86 is in its released mode. To assure against locking of planetary gearset 28, it is understood that first range clutch 82 is shifted into its released mode prior to shifting of second range clutch 84 into its locked mode.

When it is desired to shift into an "overdrive" mode such as, for example, during high-speed highway driving, a mode signal is sent by mode shift mechanism 56 to controller 52. In response to this mode signal, controller 52 causes hydraulic control system 58 to send high pressure fluid to pressure chambers 122 and 176 while pressure chamber 156 is vented. This action causes piston 114 of first range clutch 82 to move from its engaged position to its released position for releasing clutch pack 96. Moreover, venting of pressure chamber 156 causes piston 154 of second range clutch 84 to be maintained in, or move to, its released position for releasing clutch pack 140 such that first sun gear 64 is free to rotate. In addition, the delivery of high pressure fluid to pressure chamber 176 causes piston 174 of third range clutch 86 to move from its released position to its engaged position for causing clutch pack 162 to brake second sun gear 66. As such, the third drive connection is established with rear output shaft 26 driven at an increased speed relative to input shaft 24, thereby defining the overdrive mode. Thus, the overdrive mode is established with third range clutch 86 in its locked mode while first range clutch 82 and second range clutch 84 are in their released modes. Again, clutch pack 96 of first clutch 82 is released prior to shifting of third range clutch 86 into its locked mode.

A Neutral non-driven mode can be established by shifting first range clutch 82 into its released mode to release clutch pack 96 while second range clutch 84 and third range clutch 86 are shifted into, or maintained in, their released modes. In this Neutral mode, no drive torque is transferred from input shaft 24 to rear output shaft 26.

Figure 4:
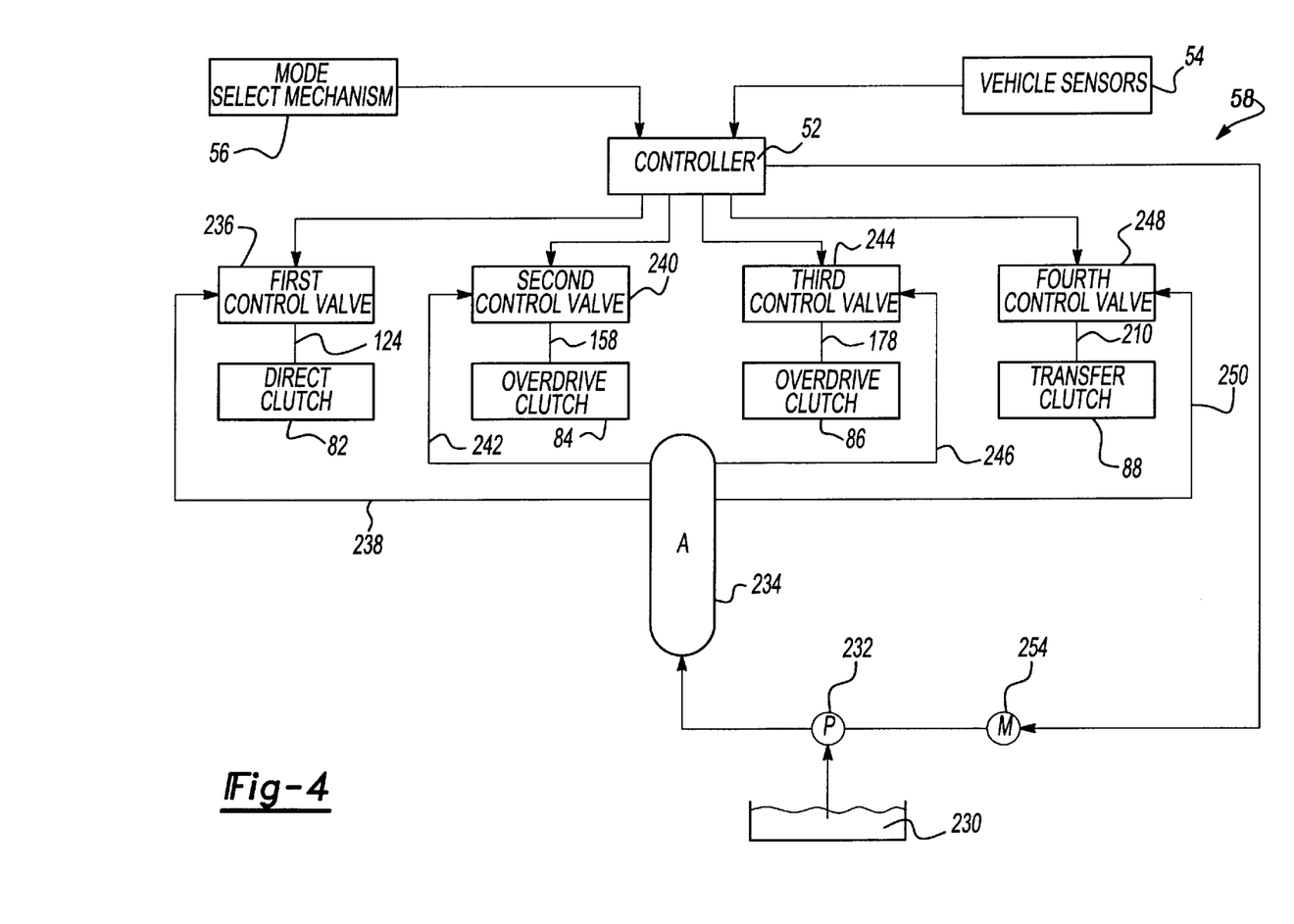
FIG. 4 is a schematic of a hydraulic control system used for controlling actuation of the powershift clutch assembly.

Referring now to FIG. 4, the various components associated with hydraulic control system 58 are schematically shown. Hydraulic control system 58 includes a reservoir or sump 230 containing hydraulic fluid, a pump 232, and an accumulator 234. Pump 232 draws fluid from sump 230 and supplies high pressure fluid to accumulator 234. A first electrically-controlled solenoid flow control valve 236 is located in a first supply line 238 between accumulator 234 and first flow pathway 124 for controlling the supply of hydraulic fluid to and from pressure chamber 122 of first range clutch 82. A second electrically-controlled solenoid flow control valve 240 is located in a second supply line 242 between accumulator 234 and second flow pathway 158 for controlling the supply of hydraulic fluid to and from pressure chamber 156 of second range clutch 84. A third electrically-controlled solenoid flow control valve 244 is located in a third supply line 246 between accumulator 234 and third flow pathway 178 for controlling the supply of hydraulic fluid to and from pressure chamber 176 of third range clutch 86. Finally, a fourth electrically-controlled solenoid flow control valve 248 is located in a fourth supply line 250 between accumulator 234 and fourth flow pathway 210 for controlling the supply of hydraulic fluid to and from pressure chamber 208 of transfer clutch 88. In one preferred arrangement, the first, second and third solenoid valves are of the on/off (i.e., two-position) variety while fourth control valve 248 is of the variable output type to permit modulation of the fluid pressure in pressure chamber 208 of transfer clutch 88. Controller 52 sends appropriate electrical control signals to each of the solenoid valves to control actuation thereof which, in turn, controls the supply of hydraulic fluid to and from each of the pressure chambers. Sensor input signals are sent to controller 52 from vehicle sensors 52 and are used for controlling adaptive actuation of transfer clutch 88 and if desired, to automatically control the conditions under which powershifts are permitted. Vehicle sensors 52 is intended to be indicative of sensors used for detecting or measuring such operating parameters as vehicle speed, interaxle speed differentiation, transmission gear, brake status, throttle position and other signals used to control driveline systems. Hydraulic pressure generated by pump 232 may be caused by driven rotation of a rotary component of transfer case 22 or, more preferably, by means of an electric motor 252. While not shown, it will be obvious that hydraulic fluid vented from the pressure chamber of each of range clutches 82, 84 and 86 and transfer clutch 88 is returned to sump 230.

Figure 5:
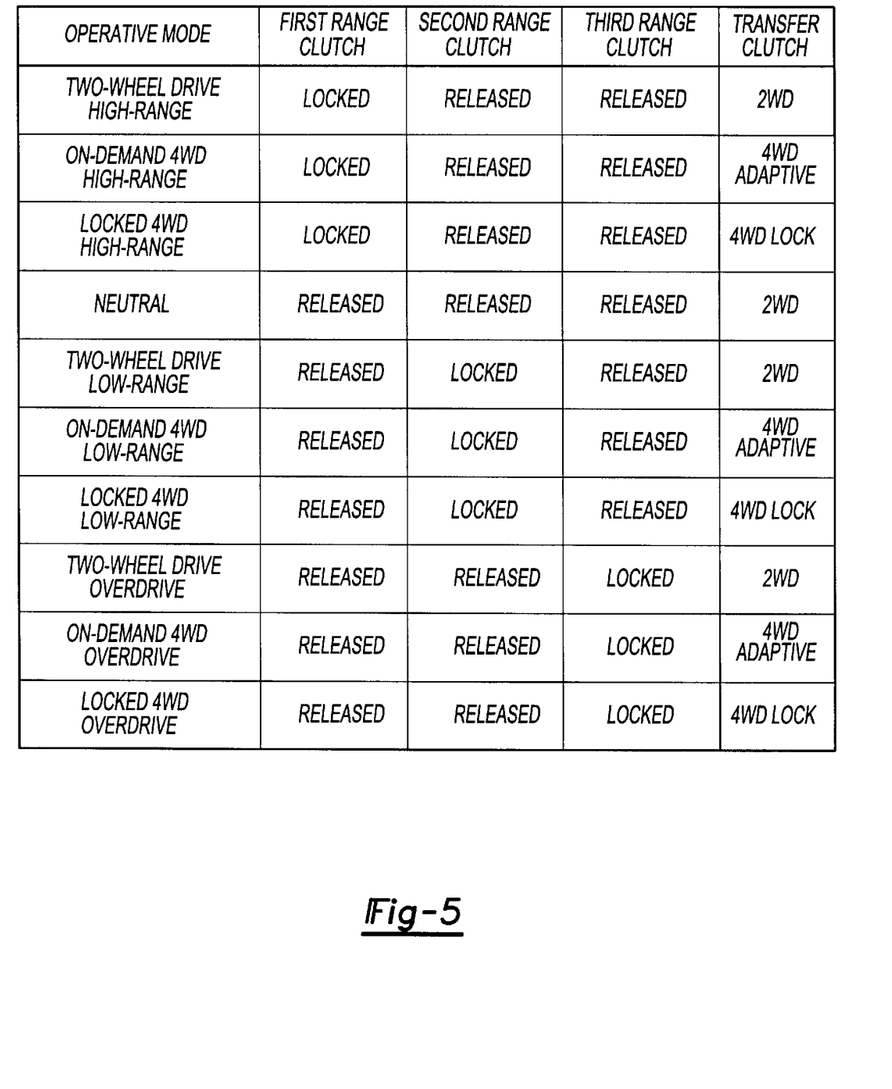
FIG. 5 is a chart listing the various drive modes available with the three-speed transfer case of the present invention.

Transfer case 22 is capable of establishing a number of distinct operative modes. A particular operative mode is established based on the actuated state of first range clutch 82, second range clutch 84, third range clutch 86 and transfer clutch 88. As is known, mode select mechanism 56 can take the form of any mode selector device under the control of the vehicle operator which can be manipulated to generate a mode signal indicative of the specific operative mode selected. Assuming availability of all of the operative modes, the various actuated state of each clutch is shown in the table provided in FIG. 5. Obviously, typical vehicular applications would limit the available number of operative modes to choose from, but FIG. 5 is exemplary of the flexibility provided by the present invention. In addition, it is contemplated that shifting between the high-range mode and the overdrive mode may be controlled automatically in coordination with controlled shifting of transmission 20. Thus, transfer case 22 permits selection of high and low speed ranges as well as providing an overdrive ratio that permits establishment of an additional forward gear ratio in conjunction with transmission 20.

Figure 6:
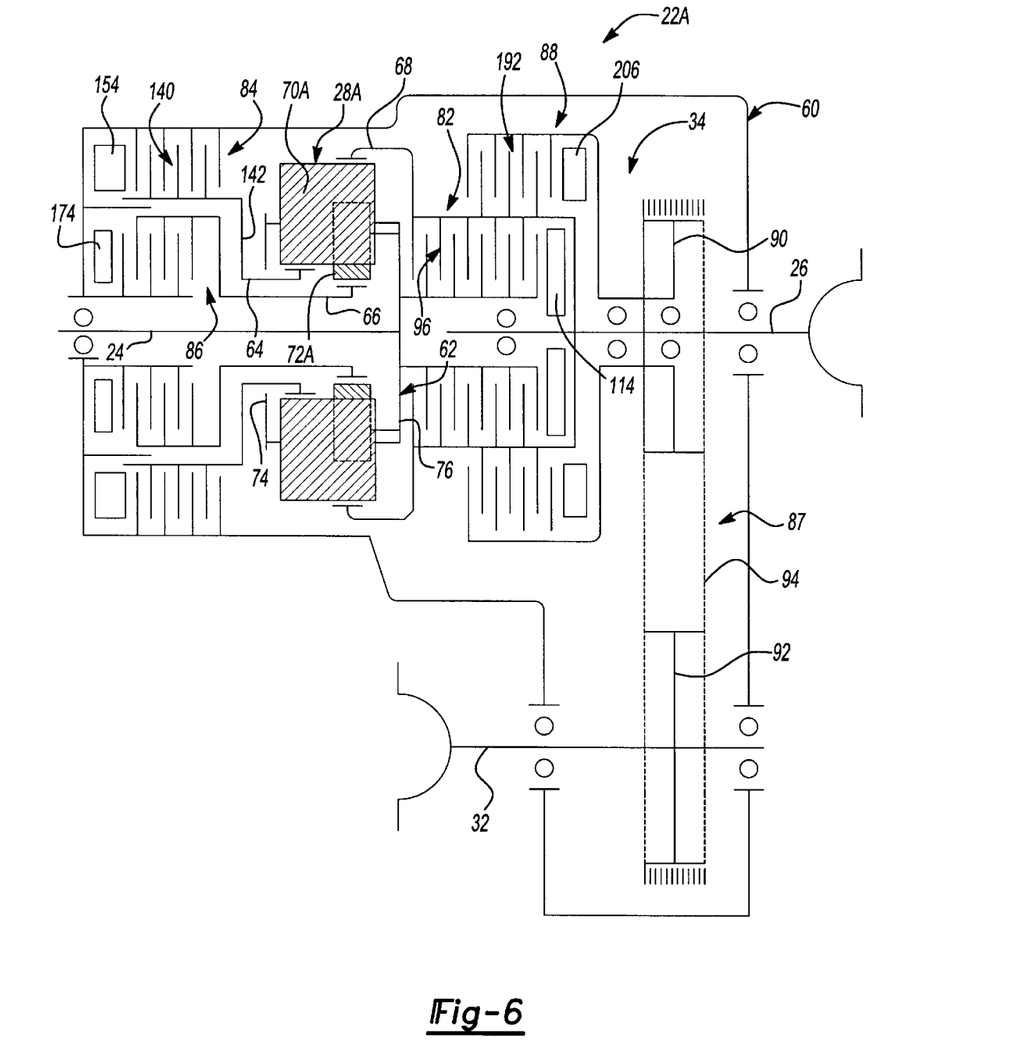
FIG. 6 is a schematic illustration of the three-speed transfer case optionally equipped with a different planetary gearset.
Figure 7:
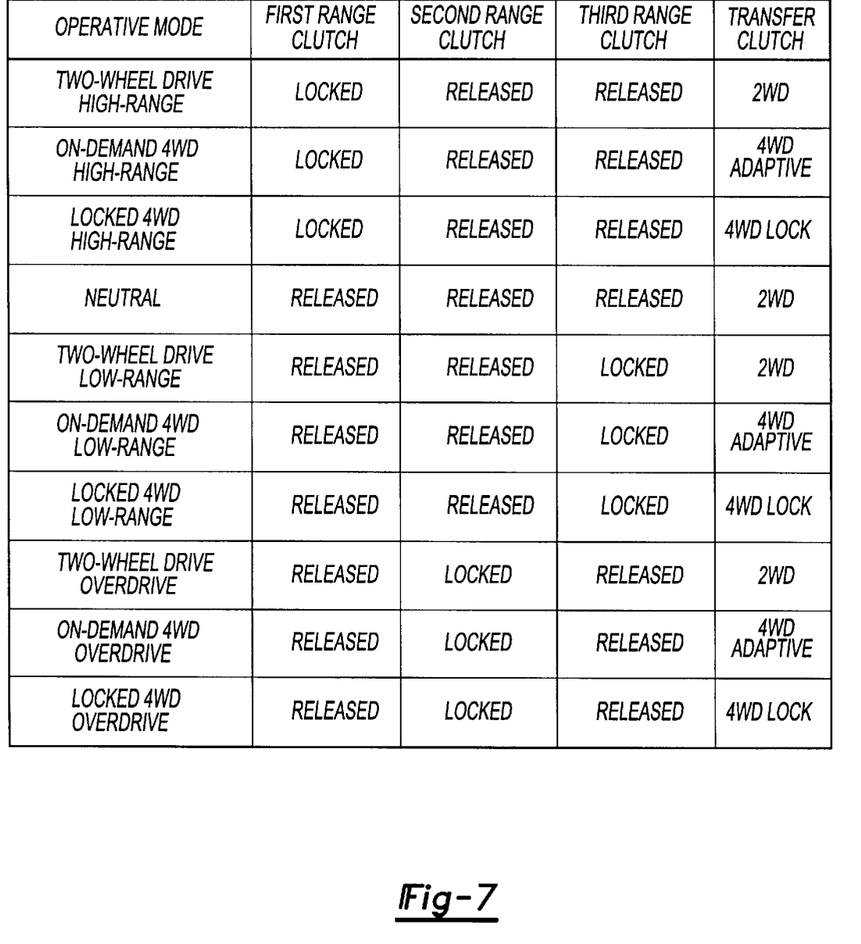
FIG. 7 is a chart listing the drive modes available with the three-speed transfer case of FIG. 6.

Referring now to FIG. 6, an alternative version of a transfer case 22A is shown to include a modified planetary gearset 28A having bigger first pinions 70A meshed with first sun gear 64 and ring gear 68 while smaller second pinions 72A are meshed with second sun gear 66. Pinions 70A and 72A are arranged in meshed pairs and are rotatably supported from planet carrier 62. In addition, third range clutch 86 is now used to establish the "low-range" drive mode while second range clutch 84 is used to establish the "overdrive" mode. Thus, the low-range drive mode is established with first range clutch 82 in its released mode, second range clutch 84 in its released mode, and third range clutch 86 in its locked mode. Similarly, the overdrive mode is established with first range clutch 82 and third range clutch 86 in their released modes with second range clutch 84 in its locked mode. This reversal in clutch actuation and the revised meshing and geometry associated with pinions 70A and 72A of gearset 28A permit generation of a lower numeric torque ratio in the low-range drive mode compared to that available with gearset 28 of transfer case 22 shown in FIGS. 2 and 3. The Table provided in FIG. 7 shows the clutch actuation states required to establish the various 2WD and 4WD operative modes at the three speed ranges.

Figure 8:
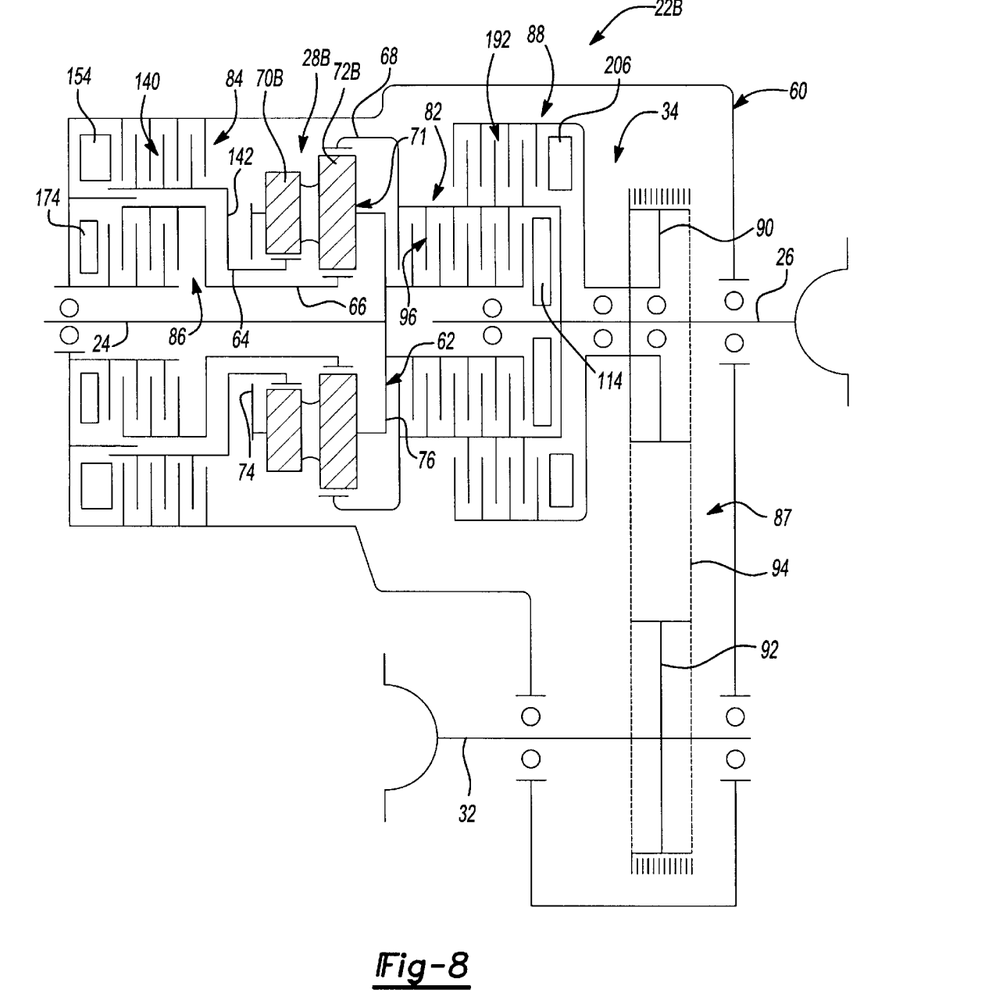
FIG. 8 is another schematic illustration of the three-speed transfer case optionally equipped with a compound pinion planetary gearset.

Referring now to FIG. 8, a further alternative version of a transfer case 22B is shown to be equipped with a planetary gearset 28B having a set of compound pinion gears 71 comprised of a first pinion 70B fixed to, or integral with, a second pinion 72B. As seen, first pinion 70B of each pinion gear 71 is meshed with first sun gear 64 while each second pinion 72B is meshed with second sun gear 66 and ring gear 68. Compound pinion gears 71 are rotatably supported from planet carrier 62. With this arrangement, the high-range and overdrive modes are established in a manner identical to that previously described in association with transfer case 22 of FIG. 2. However, actuation of second range clutch 84 in coordination with the release of first and third range clutches 82 and 86, respectively, does not establish the low-range drive mode provided by transfer case 22, but rather establishes a second overdrive mode. In particular, braking of first sun gear 64 causes ring gear 68 to rotate at an increased speed relative to carrier 62. In this manner two distinct overdrive ratios can be established in addition to the direct (high-range) speed ratio.

The foregoing discussion discloses and describes exemplary embodiments of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A transfer case for a motor vehicle having a powertrain and first and second drivelines, comprising:

an input shaft adapted to receive drive torque from the powertrain;

an output shaft adapted for connection to the first driveline;

a gearset having a first component driven by said input shaft, a second component driving said output shaft, a third component, and a fourth component;

a first clutch for selectively coupling said first component to said second component of said gearset;

a second clutch for selectively braking said third component of said gearset; and a third clutch for selectively braking said fourth component of said gearset.

2. The transfer case of claim 1 further comprising a control system for controlling actuation of said first, second and third clutches to establish three distinct speed ratio drive connections between said input shaft and said output shaft.

3. The transfer case of claim 2 wherein a first speed ratio drive connection is established between said input shaft and said output shaft when said first clutch is locked for coupling said first component for rotation with said second component, said second clutch is released to permit rotation of said third component, and said third clutch is released to permit rotation of said fourth component.

4. The transfer case of claim 3 wherein a second speed ratio drive connection is established between said input shaft and said output shaft when said first clutch is released to permit relative rotation between said first and second components of said gearset, said second clutch is locked to prevent rotation of said third component, and said third clutch is released to permit rotation of said fourth component.

5. The transfer case of claim 4 wherein a third speed ratio drive connection is established between said input shaft and said output shaft when said first clutch is released to permit relative rotation between said first and second components of said gearset, said second clutch is released to permit rotation of said third component, and said third clutch is locked to prevent rotation of said fourth component.

6. The transfer case of claim 1 wherein said first component is a carrier, said second component is a ring gear, said third component is a first sun gear, and said fourth component is a second sun gear, and wherein said gearset further includes a first pinion gear meshed with said first sun gear and rotatably supported by said carrier, and a second pinion gear meshed with said first pinion gear and said second sun gear and which is rotatably supported by said carrier, said ring gear being meshed with one of said first and second pinion gears.

7. The transfer case of claim 6 wherein:

said first clutch operable in a locked mode to couple said ring gear for common rotation with said carrier and is further operable in a released mode to permit relative rotation therebetween;

said second clutch is operable in a released mode to permit rotation of said first sun gear and is further operable in a locked mode to brake said first sun gear; and said third clutch is operable in a released mode to permit rotation of said second sun gear and is further operable in a locked mode to brake said second sun gear.

8. The transfer case of claim 7 further comprising a control system for controlling actuation of said first, second and third clutches to establish three drive connections between said input shaft and said output shaft, wherein a first drive connection is established with said first clutch in its locked mode and each of said second and third clutches in its released mode, wherein a second drive connection is established with said second clutch in its locked mode and each of said first and third clutches in its released mode, and wherein a third drive connection is established with said third clutch in its locked mode and each of said first and second clutches in its released mode.

9. The transfer case of claim 8 wherein said ring gear meshes with said second pinion such that said first drive connection establishes a direct speed ratio with rotation of said input shaft causing said output shaft to be driven at a common speed, wherein said second drive connection establishes an underdrive speed ratio with rotation of said input shaft causing said output shaft to be driven at a reduced speed, and wherein said third drive connection establishes an overdrive speed ratio with rotation of said input shaft causing said output shaft to be driven at an increased speed.

10. The transfer case of claim 8 wherein said ring gear meshes with said first pinion such that said first drive connection establishes a direct speed ratio with rotation of said input shaft causing said output shaft to be driven at a common speed, wherein said second drive connection establishes an overdrive speed ratio with rotation of said input shaft causing said output shaft to be driven at an increased speed, and wherein said third drive connection establishes an underdrive speed ratio with rotation of said input shaft causing said output shaft to be driven at a reduced speed.

11. The transfer case of claim 1 further comprising:
a second output shaft adapted for connection to the second driveline;
a transfer assembly driven by one of said first and second output shafts; and
a fourth clutch for selectively coupling said transfer assembly to the other of said first and second output shafts.

12. A transfer case comprising:
an input shaft;
an output shaft;
a planetary gearset including a first sun gear, a second sun gear, a carrier coupled to said input shaft, a first pinion supported on said carrier and meshed with said first sun gear, a second pinion supported on said carrier and meshed with said second sun gear and said first pinion, and a ring gear coupled to said output shaft and meshed with one of said first and second pinions; and
a first, second and third clutch operably associated with said planetary gearset and selectively actuated to establish three different speed ratio drive connections between said input shaft and said output shaft.

13. The transfer case of claim 12 wherein said first clutch is operable in a locked mode to couple said ring gear for rotation with said carrier and is further operable in a released mode to permit relative rotation therebetween, said second clutch is operable in a released mode to permit rotation of said first sun gear and is further operable in a locked mode to brake said first sun gear, and said third clutch is operable in a released mode to permit rotation of said second sun gear and is further operable in a locked mode to brake said second sun gear.

14. The transfer case of claim 12 further comprising:
a control system for controlling actuation of said first, second and third clutches to establish said drive connections between said input shaft and said output shaft, wherein a first drive connection is established with said first clutch in its locked mode and each of said second and third clutches in its released mode, wherein a second drive connection is established with said second clutch in its locked mode and each of said first and third clutches in its released mode, and wherein a third drive connection is established with said third clutch in its locked mode and each of said first and second clutches in its released mode.

15. The transfer case of claim 14 wherein said ring gear meshes with said second pinion such that said first drive connection establishes a direct speed ratio with rotation of said input shaft causing said output shaft to be driven at a common speed, wherein said second drive connection establishes an underdrive speed ratio with rotation of said input shaft causing said output shaft to be driven at a reduced speed, and wherein said third drive connection establishes an overdrive speed ratio with rotation of said input shaft causing said output shaft to be driven at an increased speed.

16. The transfer case of claim 14 wherein said ring gear meshes with said first pinion such that said first drive connection establishes a direct speed ratio with rotation of said input shaft causing said output shaft to be driven at a common speed, wherein said second drive connection establishes an overdrive speed ratio with rotation of said input shaft causing said output shaft to be driven at an increased speed, and wherein said third drive connection establishes an underdrive speed ratio with rotation of said input shaft causing said output shaft to be driven at a reduced speed.

17. A transfer case comprising:
an input shaft;
an output shaft;
a planetary gearset including a first sun gear, a second sun gear, a carrier coupled to said input shaft, a compound pinion gear supported on said carrier and having first and second gear segments, said first gear segment is meshed with said first sun gear and said second gear segment is meshed with said second sun gear, and a ring gear coupled to said output shaft and meshed with one of said first and second gear segment of said compound pinion gear; and
a first, second and third clutch operably associated with said planetary gearset and selectively actuated to establish three different speed ratio drive connections between said input shaft and said output shaft.

18. The transfer case of claim 17 wherein said first clutch is operable in a locked mode to couple said ring gear for common rotation with said carrier and is further operable in a released mode to permit relative rotation therebetween, said second clutch is operable in a released mode to permit rotation of said first sun gear and is further operable in a locked mode to brake said first sun gear, and said third clutch is operable in a released mode to permit rotation of said second sun gear and is further operable in a locked mode to brake said second sun gear.

19. The transfer case of claim 18 further comprising:
a control system for controlling actuation of said first, second and third clutches to establish said drive connections between said input shaft and said output shaft, wherein a first drive connection is established with said first clutch in its locked mode and each of said second and third clutches in its released mode, wherein a second drive connection is established with said second clutch in its locked mode and each of said first and third clutches in its released mode, and wherein a third drive connection is established with said third clutch in its locked mode and each of said first and second clutches in its released mode.

20. The transfer case of claim 19 wherein said first drive connection establishes a direct speed ratio with rotation of said input shaft causing said output shaft to be driven at a common speed, wherein said second drive connection establishes a first overdrive speed ratio with rotation of said input shaft causing said output shaft to be driven at an increased speed, and wherein said third drive connection establishes a second overdrive speed ratio with rotation of said input shaft causing said output shaft to be driven at an increased speed.

21. A transfer case comprising:

an input shaft;

an output shaft;

a gearset including a first sun gear, a second sun gear, a carrier coupled to said input shaft, a first pinion supported on said carrier and meshed with said first sun gear, a second pinion supported on said carrier and meshed with said second sun gear and said first pinion, and a ring gear coupled to said output shaft and meshed with one of said first and second pinions;

a first clutch having a first clutch pack operably connected between said ring gear and said carrier and a first actuator movable between first and second positions relative to said clutch pack;

a second clutch having a second clutch pack operably connected between a housing and said first sun gear and a second actuator movable between first and second positions relative to said second clutch pack; and a third clutch having a third clutch pack operably connected between a housing and said second sun gear and a third actuator movable between first and second positions.

22. The transfer case of claim 21 wherein said first actuator is operable in its first position to engage said first clutch pack for coupling said ring gear to said carrier, and said first actuator is operable in its second position to disengage said first clutch pack for permitting relative rotation between said ring gear and said carrier, said second actuator is operable in its first position to engage said second clutch pack for braking rotation of said first sun gear, and said second actuator is operable in its second position to disengage said second clutch pack for permitting rotation of said first sun gear, and said third actuator is operable in its first position to engage said third clutch pack for braking rotation of said second sun gear, and said third actuator is operable in its second position to disengage said third clutch pack for permitting rotation of said second sun gear.

23. The transfer case of claim 22 further comprising:

a control system for moving each of said first, second and third actuators between its first and second positions to establish three drive connections between said input shaft and said output shaft, wherein a first drive connection is established when said first actuator is in its first position and each of said second and third actuators is in its second position, wherein a second drive connection is established when said second actuator is in its first position and each of said first and third actuators is in its second position, and wherein a third drive connection is established when said third actuator is in its first position and each of said first and second actuators is in its second position.

24. The transfer case of claim 23 wherein said ring gear meshes with said second pinion such that said first drive connection establishes a direct speed ratio with rotation of said input shaft causing said output shaft to be driven at a common speed, wherein said second drive connection establishes an underdrive speed ratio with rotation of said input shaft causing said output shaft to be driven at a reduced speed, and wherein said third drive connection establishes an overdrive speed ratio with rotation of said input shaft causing said output shaft to be driven at an increased speed.

25. The transfer case of claim 23 wherein said ring gear meshes with said first pinion such that said first drive connection establishes a direct speed ratio with rotation of said input shaft causing said output shaft to be driven at a common speed, wherein said second drive connection establishes an overdrive speed ratio with rotation of said input shaft causing said output shaft to be driven at an increased speed, and wherein said third drive connection establishes an underdrive speed ratio with rotation of said input shaft causing said output shaft to be driven at a reduced speed.

26. The transfer case of claim 21 further comprising:

a second output shaft;

a transfer assembly coupled to one of said first and second output shafts; and a fourth clutch for coupling said transfer assembly to the other of said first and second output shafts.

* * * * *